US012000364B2

(12) United States Patent
Masuda et al.

(10) Patent No.: US 12,000,364 B2
(45) Date of Patent: Jun. 4, 2024

(54) STEEL PIPE FOR FUEL INJECTION PIPE AND FUEL INJECTION PIPE USING THE SAME

(71) Applicants: USUI KOKUSAI SANGYO KAISHA, LTD., Shizuoka (JP); NIPPON STEEL & SUMITOMO METAL CORPORATION, Tokyo (JP)

(72) Inventors: Tatsuya Masuda, Shizuoka (JP); Tsugumi Yamazaki, Shizuoka (JP); Taizo Makino, Tokyo (JP); Katsunori Nagao, Tokyo (JP); Tsutomu Okuyama, Tokyo (JP)

(73) Assignees: USUI CO., LTD., Shizuoka (JP); NIPPON STEEL CORPORATION, Tokyo (JP)

( * ) Notice: Subject to any disclaimer, the term of this patent is extended or adjusted under 35 U.S.C. 154(b) by 792 days.

(21) Appl. No.: 15/121,058

(22) PCT Filed: Feb. 23, 2015

(86) PCT No.: PCT/JP2015/055018

§ 371 (c)(1),
(2) Date: Aug. 24, 2016

(87) PCT Pub. No.: WO2015/129617

PCT Pub. Date: Sep. 3, 2015

(65) Prior Publication Data

US 2016/0369759 A1 Dec. 22, 2016

(30) Foreign Application Priority Data

Feb. 25, 2014 (JP) ................................ 2014-034416

(51) Int. Cl.

| | |
|---|---|
| ***C22C 38/02*** | (2006.01) |
| ***C21D 8/10*** | (2006.01) |
| ***C21D 9/08*** | (2006.01) |
| ***C21D 9/14*** | (2006.01) |
| ***C22C 38/00*** | (2006.01) |
| ***C22C 38/04*** | (2006.01) |
| ***C22C 38/06*** | (2006.01) |
| ***C22C 38/08*** | (2006.01) |

(Continued)

(52) U.S. Cl.

CPC ............... *F02M 55/02* (2013.01); *C21D 8/10* (2013.01); *C21D 8/105* (2013.01); *C21D 9/14* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/22* (2013.01); *C22C 38/26* (2013.01); *C22C 38/28* (2013.01); *C22C 38/42* (2013.01); *C22C 38/44* (2013.01); *C22C 38/46* (2013.01); *C22C 38/48* (2013.01); *C22C 38/50* (2013.01); *C21D 7/10* (2013.01); *C21D 9/08* (2013.01); *C21D 2211/002* (2013.01); *C21D 2211/008* (2013.01); *F02M 2200/9061* (2013.01)

(58) Field of Classification Search

CPC ......... C22C 38/02; C22C 38/04; C22C 38/42; C22C 38/00; C22C 38/001; C22C 38/06; C22C 38/22; C22C 38/28; C22C 38/44; C22C 38/46; C22C 38/48; C22C 38/50; C22C 38/08; C22C 38/12; C22C 38/14; C22C 38/16; C22C 38/24; C22C 38/26; C22C 38/58; C21D 9/08; C21D 9/14; C21D 8/10; C21D 8/002; C21D 8/008; F16L 9/02

USPC ......................... 148/320, 333, 334, 570, 909

See application file for complete search history.

(56) References Cited

U.S. PATENT DOCUMENTS

2005/0279327 A1* 12/2005 Morita .................. F02M 55/02 123/468
2012/0186704 A1* 7/2012 Eguchi .................... C21D 9/14 148/500

(Continued)

FOREIGN PATENT DOCUMENTS

CN 101421428 4/2009
CN 101688505 3/2010

(Continued)

OTHER PUBLICATIONS

Y. Murakami, “Kinzoku Hirou-Bishou Kekkan to Kaizaibutsu no Eikyou (in Japanese)”, (“Metal Fatigue—The Effect of Minute Defects and Inclusions”), First Edition 1993, Yokendo, p. 18.

*Primary Examiner* — Matthew E. Hoban
*Assistant Examiner* — Lynne Edmondson
(74) *Attorney, Agent, or Firm* — Clark & Brody LP

(57) ABSTRACT

A steel pipe has a composition consisting, by mass percent, of, C: 0.12 to 0.27%, Si: 0.05 to 0.40%, Mn: 0.3 to 2.0%, Al: 0.005 to 0.060%, N: 0.0020 to 0.0080%, Ti: 0.005 to 0.015%, Nb: 0.015 to 0.045%, Cr 0 to 1.0%, Mo: 0 to 1.0%, Cu: 0 to 0.5%, Ni: 0 to 0.5%, V: 0 to 0.15%, and B: 0 to 0.005%, the balance being Fe and impurities. As impurities, contents are Ca: 0.001% or less, P: 0.02% or less, S: 0.01% or less, and O: 0.0040% or less. The micro-structure is tempered martensitic or tempered martensite and tempered bainite, in which a prior-austenite grain size number is 10.0 or more. Tensile strength is TS 800 MPa or higher. Critical internal pressure is [0.3'TS'a] or more, $a=[(D/d)^2-1]/[0.776'(D/d)^2]$, D: pipe outer diameter (mm), d: pipe inner diameter (mm).

8 Claims, No Drawings

(51) Int. Cl.

| | |
|---|---|
| ***C22C 38/12*** | (2006.01) |
| ***C22C 38/14*** | (2006.01) |
| ***C22C 38/16*** | (2006.01) |
| ***C22C 38/22*** | (2006.01) |
| ***C22C 38/26*** | (2006.01) |
| ***C22C 38/28*** | (2006.01) |
| ***C22C 38/42*** | (2006.01) |
| ***C22C 38/44*** | (2006.01) |
| ***C22C 38/46*** | (2006.01) |
| ***C22C 38/48*** | (2006.01) |
| ***C22C 38/50*** | (2006.01) |
| ***F02M 55/02*** | (2006.01) |
| *C21D 7/10* | (2006.01) |

(56) References Cited

U.S. PATENT DOCUMENTS

2012/0199255 A1* 8/2012 Anelli ...................... C21D 1/18
148/593
2014/0352836 A1 12/2014 Eguchi et al.
2018/0171426 A1* 6/2018 Masuda ................... C21D 7/04

FOREIGN PATENT DOCUMENTS

| | | |
|---|---|---|
| EP | 2022866 | 2/2009 |
| EP | 2177745 | 4/2010 |
| EP | 2 796 587 | 10/2014 |
| JP | 09-57329 | 3/1997 |
| JP | 2011-246798 | 12/2011 |
| KR | 10-2010-0029271 | 3/2010 |
| MX | 2014007572 | 8/2014 |
| WO | 2007/119734 | 10/2007 |
| WO | 2009/008281 | 1/2009 |
| WO | 2010/150915 | 12/2010 |
| WO | 2013/094179 | 6/2013 |

* cited by examiner

STEEL PIPE FOR FUEL INJECTION PIPE AND FUEL INJECTION PIPE USING THE SAME

TECHNICAL FIELD

The present invention relates to a steel pipe for fuel injection pipe and a fuel injection pipe using the same. In particular, the present invention relates to a steel pipe for fuel injection pipe having a tensile strength of 800 MPa or higher, preferably 900 MPa or higher and excellent in internal pressure fatigue resistance, and to a fuel injection pipe using the same.

BACKGROUND ART

As countermeasures against energy exhaustion in future, the movement for promoting energy saving, the movement for recycling resources, and the development of technologies to achieve these goals have gained momentum. In recent years, in particular, there have been strong demands for the reduction of $CO_2$ emissions with fuel combustion to prevent the global warming, as worldwide efforts.

Internal combustion engines with low $CO_2$ emissions include diesel engines used in automobiles or the like. However, while emitting less $CO_2$, diesel engines suffer from a problem of generating black smoke. Black smoke is generated for lack of oxygen with respect to injected fuel. Specifically, some of the fuel is thermally decomposed, which causes dehydrogenation to generate a precursor of black smoke, and this precursor is thermally decomposed again and agglomerated and combined to form black smoke. The black smoke generated in such a manner brings about air pollution, and there is a concern of an adverse effect thereof on human bodies.

The amount of generated black smoke described above can be reduced by increasing the injection pressure of fuel to combustion chambers of a diesel engine. However, for this purpose, a steel pipe used for fuel injection is required to have a high fatigue strength. For such a fuel injection pipe or a steel pipe for fuel injection pipe, the following techniques have been disclosed.

Patent Document 1 discloses a method for producing a steel pipe used for fuel injection in a diesel engine, in which the inner surface of a seamless steel pipe starting material subjected to hot rolling is ground and abraded by shot blasting, and the starting material is thereafter subjected to cold drawing. Patent Document 1 describes that, by employing this production method, it is possible to make the depths of flaws on the steel pipe inner surface (e.g., unevenness, fracture, fine crack, or the like) 0.10 mm or less, achieving a high strength of a steel pipe used for fuel injection.

Patent Document 2 discloses a steel pipe for fuel injection pipe in which the maximum diameter of nonmetallic inclusions existing at up to a depth of 20 μm from the inner surface of the steel pipe is 20 μm or less, the steel pipe having a tensile strength of 500 MPa or higher.

Patent Document 3 discloses a steel pipe for fuel injection pipe having a tensile strength of 900 $N/mm^2$ or higher, in which the maximum diameter of nonmetallic inclusions existing at up to a depth of 20 μm from the inner surface of the steel pipe is 20 μm or less.

The invention of Patent Document 3 achieves a tensile strength of 900 MPa or higher by producing a material steel pipe using steel materials from which A type, B type, and C type coarse inclusions are removed through reducing S (sulfur), devising a casting method, reducing Ca (calcium), and the like, adjusting the diameter of the material steel pipe into an intended diameter by cold rolling, and thereafter performing quench and temper. In examples, critical internal pressures of 260 to 285 MPa are achieved.

LIST OF PRIOR ART DOCUMENTS

Patent Document

Patent Document 1: JP9-57329A
Patent Document 2: WO 2007/119734
Patent Document 3: WO 2009/008281

Non Patent Document

Non Patent Document 1: Y. Murakami, "Kinzoku Hirou—Bishou Kekkan to Kaizaibutsu no Eikyou (in Japanese)" ("Metal Fatigue—The Effect of Minute Defects and Inclusions"), First Edition (1993), Yokendo, p. 18

DISCLOSURE OF THE INVENTION

Problems to be Solved by the Invention

A steel pipe used for fuel injection produced by the method disclosed in Patent Document 1 has a high strength but cannot offer a fatigue life appropriate to the strength of the steel pipe material thereof. As a matter of course, a higher strength of a steel pipe material allows a higher pressure to be applied to the inside of the steel pipe. However, in the case of applying a pressure to the inside of a steel pipe, an internal pressure to be a limit within which no fracture due to fatigue occurs on a steel pipe inner surface (hereafter, referred to as a critical internal pressure) does not depend only on the strength of a steel pipe material. In other words, even if the strength of the steel pipe material is increased, a critical internal pressure more than expected cannot be obtained. Considering the reliability of an end product and the like, the longer the fatigue life is, the more preferable it is, but the lower the critical internal pressure is, the shorter the fatigue life becomes because the steel pipe is prone to be fatigued with use under high internal pressures.

The steel pipes for fuel injection pipe disclosed in Patent Documents 2 and 3 are characterized by long fatigue lives and high reliabilities. However, the critical internal pressure of the steel pipe disclosed in Patent Document 2 is 255 MPa or less, and 260 to 285 MPa in Patent Document 3. In particular, in the automotive industry, recent trends demand still higher internal pressures, and there is a desire for the development of fuel injection pipes having tensile strengths of 800 MPa or higher and critical internal pressures more than 270 MPa, and particularly desirably, the development of fuel injection pipes having tensile strengths of 900 MPa or higher and critical internal pressures more than 300 MPa. Note that, in general, the critical internal pressure tends to increase slightly depending on the tensile strength of a fuel injection pipe but is considered to be influenced by various factors, and it is not necessarily easy to secure a high critical internal pressure stably for a high-strength fuel injection pipe of 800 MPa or higher.

An objective of the present invention is to provide a steel pipe for fuel injection pipe of high reliability having a tensile strength (TS) of 800 MPa or higher, preferably 900 MPa or higher, and such high critical internal pressure properties that its critical internal pressure is $0.3 \times TS \times \alpha$ or more, and a fuel injection pipe including the steel pipe. Note that a is, as will be described later, a coefficient for correcting changes in the relation between an internal pressure and stress occurring on a pipe inner surface according to a pipe inner diameter ratio, and a takes on 0.97 to 1.02, that is, approximately 1 when D/d, a ratio of an outer diameter D to an inner diameter d of the pipe, falls within the range of 2 to 2.2.

Means for Solving the Problems

The present inventors prototyped steel pipes for fuel injection pipe using high-strength steel pipes under various heat treatment conditions and examined the critical internal pressures and the breakage modes of the steel pipes, obtaining the following findings as a result.

(a) When an internal pressure fatigue test on a sample is conducted, a fatigue crack develops and propagates from the inner surface of the sample, having a high stress, as an originating point, and fracture occurs as the fatigue crack reaches the outer surface of the sample. At this time, inclusions are present in some cases at the originating portion and absent in other cases.

(b) When inclusions are absent in the originating portion, a flat fracture surface mode, called a facet fracture surface, is recognized there. This is formed by the propagation of a crack, initiated on a per grain basis, over several grains therearound in a shearing mode called Mode II. When this facet fracture surface grows to its critical level, the propagation mode thereof changes to an opening mode called Mode I, resulting in a breakage. The growth of the facet fracture surface depends on a prior-austenite grain diameter (hereafter, referred to as a prior γ grain diameter), which is a dimension unit of initial crack development, and the growth is promoted when the prior γ grain diameter is large, namely when the grain size number of prior γ grains is small. This means that a large prior γ grain diameter leads to a decrease in the fatigue strength of a matrix structure even when inclusions do not serve as an originating point.

(c) Specifically, with prior γ grains having a grain size number increased to 10.0 or more, no breakage occurred in an internal pressure fatigue test in which an internal pressure up to 300 MPa can be applied, even when the number of repetitions reached $10^7$. In contrast, with a steel pipe that has been subjected to insufficient grain refinement to have a grain size number of less than 10.0, there was recognized a situation where a critical internal pressure was decreased even when inclusions did not serve as an originating point because the fatigue strength of a metal micro-structure is decreased.

(d) In order to stably obtain in industrial production a fine grain metal micro-structure including prior γ grains with a grain size number of 10.0 or more, it is important to set the contents of Ti and Nb in steel at certain amounts or more.

(e) In order to stably suppress sulfide-based inclusions (Group A in JIS G 0555) in an industrial manner, it is suitable to use Al (aluminum) as a deoxidizer and control sol. Al in steel within an appropriate range.

(f) Although the suppression of inclusions can be made relatively stably, when the content of Ti exceeds 0.15%, composite inclusions was observed through fracture surface observation on a steel pipe having been subjected to the internal pressure fatigue test, the composite inclusions including a plurality of A1203-based inclusions having diameters of 20 μm or less that are bridged by film-shaped thin layers containing Ti as a main component (hereafter, referred to as Ti—Al composite inclusions). From this observation, it was clarified that setting the content of Ti at a certain value or less enables suppressing the formation of Ti—Al composite inclusions, so as to relieve internal pressure fatigue.

Note that the problems described above due to inclusions in Ti-containing steel were made clear from the results of the following reference experiments.

Reference Experiment 1

First, as a preliminary test, an internal pressure fatigue test was conducted using a steel having a relatively low strength. Three kinds of starting materials A, B, and C having chemical compositions shown in Table 1 were fabricated with a converter and continuous casting. In the continuous casting, a casting speed in casting was set at 0.5 m/min and the cross-sectional area of a cast piece was set at 200,000 $mm^2$ or more. The obtained slab was subjected to blooming into a billet for pipe making, and a material pipe was produced by subjecting the billet to piercing rolling and elongating rolling in the Mannesmann-mandrel pipe-making process and to stretch reducing mill diameter adjusting rolling. Then, annealing and cold drawing were repeated a plurality of times to subject the material pipe to radial contraction into a predetermined finish size, and thereafter normalizing treatment was performed. At this time, the normalizing treatment was carried out under the condition of air cooling after holding at 980° C.×60 min. Then, the material pipe was cut into a predetermined length, subjected to pipe end working, and made into an injection pipe product specimen for internal pressure fatigue test. The tensile strength of the steel A was 718 MPa, that of the steel B was 685 MPa, and that of the steel C was 723 MPa.

TABLE 1

| | Chemical composition (in mass %, balance: Fe and impurities) | | | | | | | | | | | | | | |
|---|---|---|---|---|---|---|---|---|---|---|---|---|---|---|---|
| steel | C | Si | Mn | Al | N | Ti | Nb | Cr | Mo | Cu | Ni | V | Ca | P | S | O |
| A | 0.15 | 0.22 | 0.51 | 0.015 | 0.0030 | 0.008 | 0.022 | 0.76 | 0.30 | — | — | — | 0.0001 | 0.011 | 0.0012 | 0.0012 |
| B | 0.20 | 0.31 | 1.42 | 0.037 | 0.0032 | 0.010 | 0.031 | 0.06 | 0.18 | 0.02 | 0.02 | 0.06 | 0.0001 | 0.014 | 0.0030 | 0.0010 |
| C | 0.21 | 0.33 | 1.43 | 0.017 | 0.0044 | 0.020* | 0.035 | 0.05 | 0.18 | 0.02 | 0.03 | 0.06 | 0.0001 | 0.014 | 0.0040 | 0.0012 |

*indicates that conditions do not satisfy those defined by the present invention.

The dimensions of the samples were an outer diameter of 6.35 mm, an inner diameter of 3.00 mm, and a length of 200 mm. For each sample, 30 samples were used in the internal pressure fatigue test. The conditions of the fatigue test are such that one end face of a sample is sealed, the inside of the sample is filled, from the other end face, with a hydraulic fluid as a pressure medium, and the internal pressure of a filled portion was repeatedly fluctuated within the range from a maximum of 300 MPa to a minimum of 18 MPa. The frequency of the internal pressure fluctuations was set at 8 Hz.

As a result of the internal pressure fatigue test with a maximum internal pressure of 300 MPa, in all the samples, a crack occurred and propagated on an inner surface before the number of repetitions reached $2\times10^6$ cycles, and a breakage occurred by the crack reaching an outer surface to leak.

For all the broken samples, a fracture surface of a leak occurring portion of the sample was exposed, and the originating portion of the leak occurring portion was observed using a SEM, and the presence/absence of inclusions was identified and the dimensions of the inclusions were measured. The dimensions of the inclusions was calculated in terms of √area by measuring, through image processing, an area of the inclusions and a maximum width c from the inner surface in a depth direction (a pipe radial direction). Note that, as the √area, the numerical value of smaller one of the square root of the area and (√10)·c is adopted. This definition is based on a concept described in Non Patent Document 1.

The obtained results are shown in Table 2. In the example using the steel C having a high content of Ti, in 14 of the 30 samples, inclusions just below on the inner surface serve as an originating point, and most of the dimensions thereof were 60 μm or less in terms of √area, except for one in which the dimension was 111 μm in terms of √area. These inclusions were Ti—Al composite inclusions. In contrast, in the examples using the steels A and B having low contents of Ti, in all the samples, there were no inclusions at the originating point of the crack, and a matrix structure on the inner surface served as the originating point in all the cases. In this regard, the shortest breakage life was $3.78\times10^5$ cycles of the sample of the steel C where the maximum inclusions were detected, while 4.7 to $8.0\times10^5$ cycles in the other 29 samples. In contrast, there was no large difference in breakage life between the steels A and B, which was 6.8 to $17.7\times10^5$ cycles, and thus the influence of Ti—Al composite inclusions on internal pressure fatigue is obviously recognized. Then, it can be estimated that an increase in the content of Ti causes the precipitation of coarse Ti—Al composite inclusions, which leads to a decrease in internal pressure fatigue.

TABLE 2

| Inclusions size | The number of samples | | |
|---|---|---|---|
| √ area (μm) | A | B | C * |
| Nothing | 30 | 30 | 16 |
| Less than 10 | 0 | 0 | 0 |
| 10 or more and less than 20 | 0 | 0 | 0 |
| 20 or more and less than 30 | 0 | 0 | 4 |
| 30 or more and less than 40 | 0 | 0 | 6 |
| 40 or more and less than 50 | 0 | 0 | 2 |
| 50 or more and less than 60 | 0 | 0 | 1 |
| 60 or more and less than 70 | 0 | 0 | 0 |
| 70 or more and less than 80 | 0 | 0 | 0 |
| 80 or more and less than 90 | 0 | 0 | 0 |
| 90 or more and less than 100 | 0 | 0 | 0 |
| 100 or more and less than 110 | 0 | 0 | 0 |
| 110 or more and less than 120 | 0 | 0 | 1 |
| 120 or more | 0 | 0 | 0 |

* indicates that conditions do not satisfy those defined by the present invention.

Reference Experiment 2

Next, a fatigue test with a maximum internal pressure of 340 MPa was conducted using a steel having a tensile strength of 900 MPa or higher. Three samples of the starting materials B and C having the chemical components shown in Table 1 described above were manufactured using a converter and continuous casting. In the continuous casting, a casting speed in casting was set at 0.5 m/min, and the cross-sectional area of a cast piece was set at 200,000 $mm^2$ or more. A billet for pipe making was produced from the steel starting material describe above, subjected to piercing rolling and elongating rolling in the Mannesmann-mandrel pipe-making process, and subjected to a hot rolling process by stretch reducing mill diameter adjusting rolling, to have dimensions of an outer diameter of 34 mm, and a wall thickness of 4.5 mm. To draw this hot finished material pipe, nosing was first performed on a front end of the material pipe, and lubricant was applied. Subsequently, the drawing was performed using a die and a plug, softening annealing was performed as necessary, and the pipe diameter was gradually decreased to finish the material pipe as a steel pipe having an outer diameter of 6.35 mm and an inner diameter of 3.0 mm. Then, the steel pipe was subjected to quenching of high-frequency heating to 1000° C. and water cooling, thereafter subjected to tempering of holding at 640° C. for 10 min and allowing cooling, and a descaling and smoothing process was performed on the outer and inner surfaces of the steel pipe.

Afterward, each sample was cut to have a length of 200 mm, subjected to pipe end working, and subjected to the internal pressure fatigue test as an injection pipe specimen for internal pressure fatigue test. The fatigue test is a test performed by filling, from one end face of a sample, the inside of the sample with a hydraulic oil, as a pressure medium, with the other end face sealed, and repeatedly fluctuating the internal pressure of a filled portion in the range from a maximum of 340 MPa to a minimum of 18 MPa such that the internal pressure follows a sine wave over time. The frequency of the internal pressure fluctuations was set at 8 Hz. The results are shown in Table 3.

TABLE 3

| steel | Sample | The number of repetitions | Result |
|---|---|---|---|
| B | B-1 | $5.0 \times 10^6$ | No fracture |
| | B-2 | $5.0 \times 10^6$ | No fracture |
| | B-3 | $5.0 \times 10^6$ | No fracture |
| C * | C-1 | $3.63 \times 10^5$ | Fatigue fracture from pipe inner surface |
| | C-2 | $5.0 \times 10^6$ | No fracture |
| | C-3 | $5.0 \times 10^6$ | No fracture |

* indicates that conditions do not satisfy those defined by the present invention.

As shown in Table 3, in the example using the steel B having a low content of Ti, in all three samples, no breakage (leak) occurred even when the number of repetitions reached $5.0\times10^6$ cycles. In contrast, in the example using the steel C having a high content of Ti, in one of three samples, a fatigue fracture occurred from a pipe inner surface when the number of repetitions reached $3.63\times10^5$ cycles. As a result of observing an originating portion in the sample where the fatigue fracture occurred using a SEM, Ti—Al composite inclusions were recognized, the dimension of which was 33 μm in terms of $\sqrt{area}$. Also from the experimental results described above, it is understood that there are tendencies to cause coarse Ti—Al composite inclusions to precipitate and to be prone to cause fatigue fracture when using a sample having a high content of Ti.

The present invention is made based on the findings described above, and involves the following steel pipe for fuel injection pipe and a fuel injection pipe using the same.

(1) A steel pipe for fuel injection pipe having a chemical composition consisting, by mass percent, of C: 0.12 to 0.27%,
Si: 0.05 to 0.40%,
Mn: 0.3 to 2.0/0,
Al: 0.005 to 0.060%,
N: 0.0020 to 0.0080%,
Ti: 0.005 to 0.015%,
Nb: 0.015 to 0.045%,
Cr: 0 to 1.0%,
Mo: 0 to 1.0%,
Cu: 0 to 0.5%,
Ni: 0 to 0.5%,
V: 0 to 0.15%, and
B: 0 to 0.005%,
the balance being Fe and impurities, and
contents of Ca, P, S, and O in the impurities being
Ca: 0.001% or less,
P: 0.02% or less,
S: 0.01% or less, and
O: 0.0040% or less, and having a metal micro-structure consisting of a tempered martensitic structure, or a mixed structure of tempered martensite and tempered bainite, in which a prior-austenite grain size number is 10.0 or more, wherein the steel pipe has a tensile strength of 800 MPa or higher, preferably 900 MPa or higher, and a critical internal pressure satisfying a following formula (i):

$$IP \geq 0.3 \times TS \times \alpha \quad (i)$$

$$\alpha = [(D/d)^2 - 1]/[0.776 \times (D/d)] \quad (ii)$$

where, in the above formula (i), IP denotes a critical internal pressure (MPa), TS denotes a tensile strength (MPa), and a is a value represented by the above formula (ii), and where, in the above formula (ii), D denotes an outer diameter (mm) of the steel pipe for fuel injection pipe, and d denotes an inner diameter (mm) of the steel pipe for fuel injection pipe.

(2) The steel pipe for fuel injection pipe according to the above (1), wherein the chemical composition contains, by mass percent, one or more elements selected from
Cr: 0.2 to 1.0%,
Mo: 0.03 to 1.0%,
Cu: 0.03 to 0.5%,
Ni: 0.03 to 0.5%,
V: 0.02 to 0.15%, and
B: 0.0003 to 0.005%.

(3) The steel pipe for fuel injection pipe according to the above (1) or (2), wherein the outer diameter and the inner diameter of the steel pipe satisfy a following formula (iii):

$$D/d \geq 1.5 \quad (iii)$$

where, in the above formula (iii), D denotes the outer diameter (mm) of the steel pipe for fuel injection pipe, and d denotes the inner diameter (mm) of the steel pipe for fuel injection pipe.

(4) A fuel injection pipe using, as a starting material, the steel pipe for fuel injection pipe according to any one of the above (1) to (3).

Advantageous Effects of the Invention

According to the present invention, it is possible to obtain a steel pipe for fuel injection pipe that has a tensile strength of 800 MPa or higher, preferably 900 MPa or higher, and is excellent in internal pressure fatigue resistance. Therefore, the steel pipe for fuel injection pipe according to the present invention is suitably applicable especially to a fuel injection pipe for automobiles.

MODE FOR CARRYING OUT THE INVENTION

Hereinafter, each requirement of the present invention will be described in detail.

1. Chemical Composition

The reasons for restricting the elements are as described below. In the following explanation, the symbol "%" for the content of each element means "% by mass".

C: 0.12 to 0.27%

C (carbon) is an element that is effective for increasing the strength of steel inexpensively. To ensure a desired tensile strength, it is necessary to set the content of C of 0.12% or more. However, the content of C of more than 0.27% leads to a decrease in workability. Therefore, the content of C is set at 0.12 to 0.27%. The content of C is preferably 0.13% or more, more preferably 0.14% or more. In addition, the content of C is preferably 0.25% or less, more preferably 0.23% or less.

Si: 0.05 to 0.40%

Si (silicon) is an element that has not only a deoxidation function but also a function of increasing the hardenability of steel to improve the strength of the steel. To ensure these effects, it is necessary to set the content of Si of 0.05% or more. However, the content of Si of more than 0.40% leads to a decrease in toughness. Therefore, the content of Si is set at 0.05 to 0.40%. The content of Si is preferably 0.15% or more and is preferably 0.35% or less.

Mn: 0.3 to 2.0%

Mn (manganese) is an element that not only has a deoxidation function but also is effective in increasing the hardenability of steel to improve the strength and toughness of the steel. However, the content of Mn of less than 0.3% cannot provide a sufficient strength, and on the other hand, the content of Mn of more than 2.0% causes a MnS to coarsen, and to elongate and expand sometimes in hot rolling, resulting in a decrease in toughness instead. For this reason, the content of Mn is set at 0.3 to 2.0%. The content of Mn is preferably 0.4% or more, more preferably 0.5% or more. In addition, the content of Mn is preferably 1.7% or less, more preferably 1.5% or less.

Al: 0.005 to 0.060° %

Al (aluminum) is an element that is effective in deoxidizing steel and has a function of increasing the toughness and workability of steel. To obtain these effects, it is necessary to contain Al of 0.005% or more. On the other hand, when the content of Al becomes more than 0.060%, inclusions easily occur, and in particular, in the case of a steel containing Ti, the risk of causing Ti—Al composite inclusions to occur is increased. Therefore, the content of Al is set at 0.005 to 0.060%. The content of Al is preferably 0.008% or more, more preferably 0.010% or more. In addition, the content of Al is preferably 0.050% or less, more preferably 0.040% or less. In the present invention, the content of Al means the content of acid-soluble Al (sol. Al).

N: 0.0020 to 0.0080%

N (nitrogen) is an element that inevitably exists in steel as an impurity. However, in the present invention, it is necessary to make N of 0.0020% or more remain for the purpose of preventing grains from coarsening by the pinning effect of TiN. In contrast, the content of N of more than 0.0080% increases the risk of causing large Ti—Al composite inclusions to occur. Therefore, the content of N is set at 0.0020 to 0.0080%. The content of N is preferably 0.0025% or more, more preferably 0.0027% or more. In addition, the content of N is preferably 0.0065% or less, more preferably 0.0050% or less.

Ti: 0.005 to 0.015%

Ti (titanium) is an essential element in the present invention because Ti contributes to preventing grains from coarsening by finely precipitating in the form of TiN and the like. To obtain the effect, it is necessary to set the content of Ti at 0.005% or more. In contrast, when the content of Ti becomes more than 0.015%, the grain refinement effect on grains tends to be saturated, and in some cases, large Ti—Al composite inclusions may occur. Large Ti—Al composite inclusions may lead to a decrease in breakage life under conditions where an internal pressure is very high, and suppressing the occurrence of the large Ti—Al composite inclusions is considered to be important especially for in a fuel injection pipe having a tensile strength of 900 MPa or higher and such high critical internal pressure properties that its critical internal pressure is 0.3×TS×a or more. Therefore, the content of Ti is set at 0.005 to 0.015%. The content of Ti is preferably 0.006% or more, more preferably 0.007% or more. In addition, the content of Ti is preferably 0.013% or less, more preferably 0.012% or less.

Nb: 0.015 to 0.045%

Nb (niobium) is an element that is essential in the present invention for obtaining a fine grained micro-structure as desired because Nb finely disperses in steel as carbide or carbo-nitride and has an effect of firmly pinning crystal grain boundaries. In addition, the fine dispersion of Nb carbide or Nb carbo-nitride improves the strength and toughness of steel. For the purpose of the above, it is necessary to contain Nb of 0.015% or more. In contrast, the content of Nb of more than 0.045% causes the carbide and the carbo-nitride to coarsen, resulting in a decrease in toughness instead. Therefore, the content of Nb is set at 0.015 to 0.045%. The content of Nb is preferably 0.018% or more, more preferably 0.020% or more. In addition, the content of Nb is preferably 0.040% or less, more preferably 0.035% or less.

Cr: 0 to 1.0%

Cr (chromium) is an element that has an effect of improving hardenability and wear resistance, and Cr may be contained as necessary. However, the content of Cr is set at 1.0% or less if contained because the content of Cr of more than 1.0% decreases toughness and cold rolling workability. The content of Cr is preferably 0.8% or less. In order to obtain the above effect, the content of Cr is preferably set at 0.2% or more, more preferably 0.3% or more.

Mo: 0 to 1.0%

Mo (molybdenum) is an element that contributes to securing a high strength because Mo improves hardenability and increases temper softening resistance. For this reason, Mo may be contained as necessary. However, if the content of Mo is more than 1.0% the effect of Mo is saturated resulting in an increase in alloy cost. Therefore, the content of Mo is set at 1.0% or less if contained. The content of Mo is preferably 0.45% or less. In order to obtain the above effect, the content of Mo is preferably set at 0.03% or more, more preferably 0.08% or more.

Cu: 0 to 0.5%

Cu (copper) is an element that has an effect of increasing the hardenability of steel to improve the strength and toughness of the steel. For this reason, Cu may be contained as necessary. However, if the content of Cu is more than 0.5% the effect of Cu is saturated leading to a rise in an alloy cost as a result. Therefore, the content of Cu is set at 0.5% or less if contained. The content of Cu is preferably set at 0.40% or less, more preferably 0.35% or less. In order to obtain the above effect, the content of Cu is preferably set at 0.03% or more, more preferably 0.05% or more.

Ni: 0 to 0.5%

Ni (nickel) is an element that has an effect of increasing the hardenability to improve the strength and toughness of the steel. For this reason, Ni may be contained as necessary. However, if the content of Ni is more than 0.5% the effect of Ni is saturated leading to a rise in an alloy cost as a result. Therefore, the content of Ni is set at 0.5% or less if contained. The content of Ni is preferably set at 0.40% or less, more preferably 0.35% or less. In order to obtain the above effect, the content of Ni is preferably set at 0.03% or more, more preferably 0.08% or more.

V: 0 to 0.15%

V (vanadium) is an element that precipitates as fine carbide (VC) in tempering to increase temper softening resistance, enabling high-temperature tempering which in turn contributes to increasing the strength and the toughness of steel. For this reason, V may be contained as necessary. However, the content of V is set at 0.15% or less if contained because the content of V of more than 0.15% leads to a decrease in toughness instead. The content of V is preferably set at 0.12% or less, more preferably 0.10% or less. In order to obtain the above effect, the content of V is preferably set at 0.02% or more, more preferably 0.04% or more.

B: 0 to 0.005%

B (boron) is an element that has a function of increasing hardenability. For this reason, B may be contained as necessary. However, the content of B of more than 0.005% makes toughness decrease. Therefore, the content of B is set at 0.005% or less if contained. The content of B is preferably set at 0.002% or less. The hardenability improvement function owing to containing B can be obtained at the content of an impurity level, but in order to obtain the effect more prominently, the content of B is preferably set at 0.0003% or more. Note that, in order to effectively utilize the effect of B, N in steel is preferably immobilized by Ti.

The steel pipe for fuel injection pipe according to the present invention has the chemical composition consisting of the above elements from C to B, and the balance of Fe and impurities.

The term "impurities" herein means components that are mixed in steel in producing the steel industrially due to various factors including raw materials such as ores and scraps, and a producing process, and are allowed to be mixed in the steel within ranges in which the impurities have no adverse effect on the present invention.

Ca, P, S, and O in the impurities will be described below.

Ca: 0.001% or Less

Ca (calcium) has a function of agglomerating silicate-based inclusions (Group C in JIS G 0555), and the content of Ca of more than 0.001% results in a decrease in critical internal pressure because coarse C type inclusions are generated. Therefore, the content of Ca was set at 0.001% or less. The content of Ca is preferably set at 0.0007% or less, more preferably 0.0003% or less. Note that if no Ca treatment is made at all in a facility relating to steel producing and refining for a long term, Ca contamination of the facility can be eliminated, and thus it is possible to make the content of Ca in steel substantially 0%.

P: 0.02% or Less

P is an element that inevitably exists in steel as an impurity. The content of P of more than 0.02% not only leads to a decrease in hot workability but also brings about grain-boundary segregation to significantly decrease toughness. Therefore, it is necessary to set the content of P at 0.02% or less. The lower the content of P is, the more desirable it is, and the content of P is preferably set at 0.015% or less, more preferably 0.012% or less. However, the lower limit of the content of P is preferably set at 0.005% because an excessive decrease in the content of P leads to an increase in production cost.

S: 0.01% or Less

S (sulfur) is an element that, as with P, inevitably exists in steel as an impurity. The content of S of more than 0.01% causes S to segregate at grain boundaries and causes sulfide-based inclusions to occur, being prone to lead to a decrease in fatigue strength. Therefore, it is necessary to set the content of S at 0.01% or less. The lower the content of S is, the more desirable it is, and the content of S is preferably set at 0.005% or less, more preferably 0.0035% or less. However, the lower limit of the content of S is preferably set at 0.0005% because an excessive decrease in the content of S leads to an increase in production cost.

O: 0.0040% or Less

O forms coarse oxides, being prone to cause a decrease in critical internal pressure due to the formation. From such a viewpoint, it is necessary to set the content of O at 0.0040% or less. The lower the content of O is, the more desirable it is, and the content of O is preferably set at 0.0035% or less, more preferably 0.0025% or less, still more preferably 0.0015% or less. However, the lower limit of the content of O is preferably set at 0.0005% because an excessive decrease in the content of O leads to an increase in production cost.

2. Metal Micro-Structure

The metal micro-structure of the steel pipe for fuel injection pipe according to the present invention is consisting of a tempered martensitic structure, or a mixed structure of a tempered martensite and a tempered bainite. The presence of a ferrite-pearlite micro-structure in the metal micro-structure causes a breakage in a ferritic phase having a low hardness locally serving as an originating point even when a breakage at the originating point of inclusions is eliminated, and thus an expected critical internal pressure based on a macroscopic hardness and a tensile strength cannot be obtained. In addition, with a metal micro-structure containing no tempered martensite or a ferrite-pearlite micro-structure, it is difficult to secure a tensile strength of 800 MPa or higher, in particular a tensile strength of 900 MPa or higher.

In addition, as described above, in order to improve the fatigue strength of a steel pipe, it is necessary to set a prior-austenite grain size number at 10.0 or more. This is because, in a steel pipe that has been subjected to insufficient grain refinement to have a grain size number of less than 10.0, the fatigue strength of a metal micro-structure decreases, and thus the critical internal pressure of the steel even when inclusions do not serve as an originating point. Note that the grain size numbers described here are defined in ASTM E112.

3. Mechanical Property

The steel pipe for fuel injection pipe according to the present invention has a tensile strength of 800 MPa or higher, and the critical internal pressure thereof satisfies the following formula (i):

$$IP \geq 0.3 \times TS \times \alpha \quad (i)$$

$$\alpha = [(D/d)^2 - 11]/[0.776 \times (D/d)^2] \quad (ii)$$

where, in the above formula (i), IP denotes a critical internal pressure (MPa), TS denotes a tensile strength (MPa), and a denotes a value expressed by the above formula (ii). In addition, D in the above formula (ii) denotes the outer diameter (mm) of the steel pipe for fuel injection pipe, and d denotes the inner diameter (mm) of the steel pipe for fuel injection pipe. $\alpha$ is a coefficient for correcting changes in the relation between an internal pressure and a stress occurring on a pipe inner surface according to a pipe inner diameter ratio.

The reason for setting the tensile strength at 800 MPa or higher is that a tensile strength of less than 800 MPa cannot secure a burst resistance performance against an excessive pressure that is applied singly. In addition, a critical internal pressure satisfying the above formula (i) enables securing safety from fracture fatigue. The term "critical internal pressure" in the present invention means the maximum internal pressure (MPa) within which no breakage (leak) occurs after $10^7$ cycles of repetitive internal pressure fluctuations that follow a sine wave over time in an internal pressure fatigue test with a minimum internal pressure set at 18 MPa. The tensile strength is preferably set at 900 MPa or higher.

4. Size

The steel pipe for fuel injection pipe according to the present invention is not specially limited in sizes. However, a fuel injection pipe typically needs to have a certain amount of volume to reduce fluctuations in inside pressure in use. For this reason, the steel pipe for fuel injection pipe according to the present invention desirably has an inner diameter of 2.5 mm or more, more desirably 3 mm or more. In addition, a fuel injection pipe needs to withstand a high internal pressure, and the wall thickness of the steel pipe is desirably 1.5 mm or more, more desirably 2 mm or more. In contrast, an excessively large outer diameter of the steel pipe makes bending work or the like difficult. For this reason, the outer diameter of the steel pipe is desirably 20 mm or less, more desirably 10 mm or less.

Furthermore, to withstand a high internal pressure, it is desirable to make the wall thickness larger for a larger inner diameter of the steel pipe. With the inner diameter of the steel pipe constant, the outer diameter of the steel pipe is made larger with an increase in wall thickness. In other words, to withstand a high internal pressure, it is desirable to make the outer diameter of the steel pipe with an increase in the inner diameter of the steel pipe. In order to obtain a sufficient critical internal pressure for a steel pipe for fuel injection pipe, it is desirable that the outer diameter and the inner diameter of the steel pipe satisfy the following formula (iii):

$$D/d \geq 1.5 \quad (iii)$$

where, in the above formula (iii), D denotes the outer diameter (mm) of the steel pipe for fuel injection pipe, and d denotes the inner diameter (mm) of the steel pipe for fuel injection pipe.

D/d, which is the ratio of the outer diameter to the inner diameter of the above steel pipe, is more desirably 2.0 or more. In contrast, the upper limit of D/d is not specially provided, but it is desirably 3.0 or less, more desirably 2.8 or less because an excessively large value of D/d makes bending work difficult.

5. Production Method

There are no special limitations on methods for producing the steel pipe for fuel injection pipe according to the present invention, and for example, in the case of using a seamless steel pipe for the production, it is possible to produce the steel pipe by preparing an ingot in which inclusions are suppressed in advance by the following method, producing a material pipe from the ingot by a technique such as Mannesmann pipe making, giving desired size and a desired shape to the material pipe by cold rolling, and thereafter performing heat treatment.

In order to suppress the formation of inclusions, it is preferable to adjust the chemical composition as described above as well as to increase the cross-sectional area of a cast piece in casting. This is because, after casting, large inclusions float up until solidification. The cross-sectional area of a cast piece in casting is desirably 200,000 $mm^2$ or more. Furthermore, it is possible to decrease directly nonmetallic inclusions in steel by decreasing a casting speed to cause lightweight nonmetallic inclusions to float up as slag. For example, continuous casting can be carried out at a casting speed of 0.5 m/min.

On the basis of the above method, detrimental coarse inclusions are removed, but Ti—Al composite inclusions may be formed depending on the content of Ti in steel. It is presumed that the Ti—Al composite inclusions are formed in the course of the solidification. In the present invention, it is possible to prevent the formation of coarse composite inclusions by appropriately control the content of Ti.

From the cast piece obtained in such a manner, a billet for pipe-making by a method such as blooming is prepared, for example. Then, for example, the billet is subjected to piercing rolling and elongating rolling in the Mannesmann-mandrel mill pipe-making process, and finished to predetermined hot-rolling-process size by diameter adjusting rolling using a stretch reducing mill or the like. Subsequently, cold drawing is repeated several times to give predetermined cold finishing size. The cold drawing can be performed with ease by performing stress relief annealing before or in the middle of the cold drawing. In addition, it is possible to employ the other pipe-making processes such as a plug mill pipe-making process.

After performing the final cold drawing in such a manner, in order to satisfy intended mechanical characteristics of a fuel injection pipe, heat treatments of quenching and tempering are performed, which can secure a tensile strength of 800 MPa or higher, preferably 900 MPa or higher.

In the quenching treatment, it is preferable to perform heating to at least a temperature of the transformation point $Ac_3$ or more, and rapid cooling. This is because a heating temperature less than the transformation point $Ac_3$ leads to incomplete austenitization and results in insufficient martensite formation after quenching, which may cause obtaining a desired tensile strength to fail. In contrast, it is preferable to set the heating temperature at 1050° C. or less. This is because a heating temperature more than 1050° C. coarsens γ grains easily. The heating temperature is more preferably set at the transformation point $Ac_3$+30° C. or more.

A heating method in quench is not specially limited, but heating at a high temperature and for a long time causes, unless performed in a protective atmosphere, a lot of scales to be generated on a steel pipe surface, leading to a decrease in dimensional accuracy and in surface texture. Therefore, it is preferable to make a holding time as short as about 10 to 20 min in the case of furnace heating using a walking beam furnace or the like. From the viewpoint of suppressing scales, it is preferable to use, as a heating atmosphere, an atmosphere having a low oxygen potential or a reducing atmosphere, which is non-oxidizing.

It is preferable to employ a high-frequency induction heating method or a direct resistance heating method as a heating method because the heating with short time holding is thereby achieved, enabling the suppression of scales generated on a steel pipe surface to a minimum. In addition, such a heating method provides an advantage because it facilitates the grain refinement of prior γ grains by increasing a heating rate. The heating rate is preferably set at 25° C./s or more, more preferably 50° C./s or more, still more preferably 100° C./s or more.

As to cooling in quench, in order to obtain a desired tensile strength of 800 MPa or higher, preferably 900 MPa or higher stably and reliably, a cooling rate in a temperature range of 500 to 800° C. is preferably set at 50° C./s or more, more preferably 100° C./s or more, still more preferably 125° C./s or more. As a cooling method, a rapid cooling treatment such as water quench is preferably used.

A steel pipe having been subjected to rapid cooling to be cooled to a normal temperature is hard and brittle as it is, and thus it is preferable to temper the steel pipe at a temperature of the transformation point $Ac_1$ or less. A tempering temperature more than the transformation point Act causes reverse transformation, which makes it difficult to obtain desired characteristics stably and reliably. In contrast, a tempering temperature less than 450° C. is prone to make the tempering insufficient, which may lead to insufficient toughness and workability. A preferable tempering temperature is 600 to 650° C. A holding time at a tempering temperature is not specially limited and is normally about 10 to 120 min. After the tempering, bends may be straightened using a straightener as appropriate.

In addition, in order to obtain an even higher critical internal pressure, auto-frettage treatment may be performed after the quenching and tempering described above. The auto-frettage treatment is a treatment to generate a compressive residual stress by applying an excessive internal pressure so as to subject the vicinity of an inner surface to plastic deformation partially. This treatment suppresses the propagation of a fatigue crack, and the even higher critical internal pressure can be obtained. It is recommended to set the pressure in the auto-frettage treatment to be a pressure lower than a burst pressure and to be an internal pressure higher than the lower limit value of the critical internal pressure, $0.3 \times TS \times \alpha$, described above. Note that, in particular, when a tensile strength of 900 MPa or higher is secured, a high burst pressure can be obtained accordingly, and the pressure in the auto-frettage treatment can also be increased, which produces a great effect on the improvement of a critical internal pressure through the auto-frettage treatment.

The steel pipe for fuel injection pipe according to the present invention can be made into a high-pressure fuel injection pipe by, for example, forming connection heads at its both end portions.

Hereunder, the present invention is explained more specifically with reference to examples; however, the present invention is not limited to these examples.

Example

There were 13 kinds of steel starting materials fabricated using a converter and continuous casting, the steel starting materials having chemical compositions shown in Table 4. For the steels Nos. 1 to 8, steels satisfying the definition regarding the chemical composition of the steel according to the present invention were used. In contrast, for steels Nos. 9 to 13, steels having amounts of Ti and/or Nb out of the range defined in the present invention were used for comparison. In the continuous casting, for each steel, a casting speed in casting was set at 0.5 m/min, and the cross-sectional area of a cast piece was set at 200,000 $mm^2$ or more.

TABLE 4

| Steel | Chemical composition (in mass %, balance: Fe and impurities) | | | | | | | | | | | | | | | |
|---|---|---|---|---|---|---|---|---|---|---|---|---|---|---|---|---|
| No. | C | Si | Mn | Al | N | Ti | Nb | Cr | Mo | Cu | Ni | V | B | Ca | P | S | O |
| 1 | 0.15 | 0.22 | 0.51 | 0.015 | 0.0030 | 0.008 | 0.022 | 0.76 | 0.30 | — | — | — | — | 0.0001 | 0.011 | 0.0012 | 0.0012 |
| 2 | 0.23 | 0.23 | 1.55 | 0.025 | 0.0028 | 0.013 | 0.034 | — | — | — | — | — | — | 0.0002 | 0.009 | 0.0015 | 0.0014 |
| 3 | 0.21 | 0.28 | 1.39 | 0.022 | 0.0038 | 0.012 | 0.029 | — | 0.24 | — | — | 0.07 | — | 0.0002 | 0.010 | 0.0025 | 0.0011 |
| 4 | 0.20 | 0.31 | 1.42 | 0.023 | 0.0032 | 0.010 | 0.031 | 0.06 | 0.18 | — | — | 0.06 | — | — | 0.014 | 0.0030 | 0.0010 |
| 5 | 0.20 | 0.31 | 1.42 | 0.023 | 0.0032 | 0.010 | 0.031 | 0.06 | 0.18 | — | — | 0.06 | — | — | 0.014 | 0.0030 | 0.0012 |
| 6 | 0.18 | 0.23 | 1.33 | 0.024 | 0.0033 | 0.013 | 0.025 | 0.25 | — | — | — | — | — | — | 0.011 | 0.0015 | 0.0013 |
| 7 | 0.20 | 0.29 | 1.40 | 0.020 | 0.0046 | 0.011 | 0.030 | — | — | 0.28 | 0.33 | — | — | 0.0002 | 0.012 | 0.0030 | 0.0015 |
| 8 | 0.22 | 0.21 | 1.45 | 0.022 | 0.0034 | 0.010 | 0.031 | — | — | — | — | — | 0.0014 | 0.0001 | 0.011 | 0.0018 | 0.0012 |
| 9 | 0.21 | 0.33 | 1.43 | 0.017 | 0.0044 | 0.020* | 0.035 | 0.05 | 0.18 | — | — | 0.06 | — | 0.0001 | 0.014 | 0.0040 | 0.0012 |
| 10 | 0.17 | 0.31 | 1.38 | 0.025 | 0.0041 | —* | —* | — | — | — | — | — | — | 0.0001 | 0.014 | 0.0050 | 0.0012 |
| 11 | 0.21 | 0.26 | 1.40 | 0.025 | 0.0030 | 0.003* | 0.013* | 0.11 | 0.12 | — | — | 0.05 | — | — | 0.013 | 0.0012 | 0.0017 |
| 12 | 0.18 | 0.30 | 1.40 | 0.026 | 0.0045 | 0.007 | —* | 0.08 | 0.02 | — | — | 0.08 | — | 0.0001 | 0.013 | 0.0060 | 0.0010 |
| 13 | 0.19 | 0.32 | 1.36 | 0.024 | 0.0040 | 0.018* | 0.033 | 0.05 | 0.19 | — | — | 0.06 | — | 0.0001 | 0.016 | 0.0060 | 0.0012 |

*indicates that conditions do not satisfy those defined by the present invention.

A billet for pipe making was produced from the steel starting material describe above, subjected to piercing rolling and elongating rolling in the Mannesmann-mandrel pipe-making process, and subjected to a hot rolling process by stretch reducing mill diameter adjusting rolling, to have dimensions of an outer diameter of 34 mm, and a wall thickness of 4.5 mm. To draw this hot finished material pipe, nosing was first performed on a front end of the material pipe, and lubricant was applied. Subsequently, the drawing was performed using a die and a plug, softening annealing was performed as necessary, and the pipe diameter was gradually decreased to finish into predetermined dimensions. At this time, in the test Nos. 10, 12, and 13, the steel pipes were finished to have an outer diameter of 8.0 mm and an inner diameter of 4.0 mm, and in the other test Nos., the steel pipes were finished to have an outer diameter of 6.35 mm and an inner diameter of 3.0 mm. Then, quenching and tempering were performed under the conditions shown in Table 5, and descaling and smoothing processes were performed on the outer and inner surfaces of the steel pipes. At this time, the quenching was performed under the conditions of, in the test Nos. 1 to 4, 6 to 9, 11, and 12 in Table 5, high-frequency heating up to 1000° C. at a rate of temperature increase of 100° C./s, and rapid cooling (for a holding time of 5 s or less), and in the test Nos. 5, 10, and 13, holding at 1000° C. for 10 min and water cooling. The tempering was performed under the conditions of holding of 550 to 640° C.×10 min and allowing cooling. Specific tempering temperatures are also shown in Table 5.

TABLE 5

| | | Quenching | | Tempering | | Prior γ | Tensile | Critical internal | | | |
|---|---|---|---|---|---|---|---|---|---|---|---|
| Test No. | Steel No. | Temperature (° C.) | Heating method† | Temperature (° C.) | Time (min) | grain size number | strength (MPa) | pressure (MPa) | 0.3TSα (MPa) | Traits of fracture | |
| 1 | 1 | 1000 | (IH)→WQ | 640 | 10 | 10.7 | 972 | >300 | 292 | No fracture | Inventive example |
| 2 | 2 | 1000 | (IH)→WQ | 600 | 10 | 11.0 | 960 | >300 | 288 | No fracture | |
| 3 | 3 | 1000 | (IH)→WQ | 640 | 10 | 11.4 | 968 | >300 | 291 | No fracture | |
| 4 | 4 | 1000 | (IH)→WQ | 640 | 10 | 11.2 | 975 | >300 | 293 | No fracture | |
| 5 | 5 | 1000 | (Furnace)→WQ | 550 | 10 | 9.6* | 955 | 272 | 287 | Fatigue fracture from pipe inner surface | Comp. ex. |
| 6 | 6 | 1000 | (IH)→WQ | 640 | 10 | 11.2 | 966 | >300 | 295 | No fracture | Inventive example |
| 7 | 7 | 1000 | (IH)→WQ | 600 | 10 | 11.0 | 983 | >300 | 295 | No fracture | |
| 8 | 8 | 1000 | (IH)→WQ | 600 | 10 | 10.9 | 963 | >300 | 289 | No fracture | |
| 9 | 9* | 1000 | (IH)→WQ | 640 | 10 | 11.5 | 978 | >300 | 294 | No fracture | Ref. ex. |
| 10 | 10* | 1000 | (Furnace)→WQ | 550 | 10 | 8.5* | 945 | 265 | 274 | Fatigue fracture from pipe inner surface | Comparative example |
| 11 | 11* | 1000 | (IH)→WQ | 600 | 10 | 9.7* | 955 | 270 | 287 | Fatigue fracture from pipe inner surface | |
| 12 | 12* | 1000 | (IH)→WQ | 625 | 10 | 9.7* | 923 | 240 | 268 | Fatigue fracture from pipe inner surface | |
| 13 | 13* | 1000 | (Furnace)→WQ | 550 | 10 | 9.4* | 994 | 265 | 288 | Fatigue fracture from pipe inner surface | |

*indicates that conditions do not satisfy those defined by the present invention.

†"(IH)→WQ" indicates rapid cooling after high-frequency heating, and "(Furnace) → WQ" indicates rapid cooling after 10 min holding in the furnace.

On the obtained steel pipes, a tension test was conducted using No. 11 test piece defined in JIS Z 2241 (2011) to determine tensile strengths. In addition, a sample for metal micro-structure observation was taken from each steel pipe, and a cross section perpendicular to the pipe axis direction thereof was subjected to mechanical polishing. After polishing using emery paper and buff, it was confirmed using Nital etchant that the sample has a tempered martensite, or a mixed structure formed of tempered martensite and tempered bainite. Then, after buffing again, using picral etchant, prior γ crystal grain boundaries on an observation surface were made to appear. Subsequently, the prior-austenite crystal grain size number on the observation surface was determined in conformity with ASTM E112.

In an internal pressure fatigue test, each steel pipe is cut to have a length of 200 mm, subjected to pipe end working to be made into an injection pipe specimen for the internal pressure fatigue test. The fatigue test is a test performed by filling, from one end face of a sample, the inside of the sample with a hydraulic oil, as a pressure medium, with the other end face sealed, and repeatedly fluctuating the internal pressure of a filled portion in the range from a maximum internal pressure to a minimum of 18 MPa such that the internal pressure follows a sine wave over time. The frequency of the internal pressure fluctuations was set at 8 Hz. The critical internal pressure was evaluated as the maximum internal pressure within which no breakage (leak) occurs even when the number of repetitions reaches $10^7$ cycles as the result of the internal pressure fatigue test.

The results of evaluating prior γ granularities, tensile strengths, and critical internal pressures, and the values of calculating 0.3×TS×α are also shown in Table 5. In Table 5, the test Nos. 1 to 4 and 6 to 8 are example embodiments of the present invention that satisfy the definition in the present invention. In contrast, the test No. 5 is a comparative example where the chemical composition of the steel satisfies the definition in the present invention, but the prior-austenite grain size number of the steel falls out of the range defined in the present invention. In addition, the test Nos. 9 to 13 is a reference example or comparative examples where the chemical compositions of the steels fall out of the range defined in the present invention.

From Table 5, in the test Nos. 5 and 10 to 13 being comparative examples where the prior γ granularities were less than 10.0, a fatigue fracture occurred from the pipe inner surface, and thus the critical internal pressures were at levels less than 0.3α times the tensile strength. This indicates that a small prior γ granularity, namely coarse grains cause a decrease in the fatigue strength of a matrix structure, which decreases a critical internal pressure even when inclusions do not serve as an originating point. In contrast, in all of the test Nos. 1 to 4 and 6 to 8 being example embodiments of the present invention and the test No. 9 being a reference example, no fracture occurred even after $10^7$ cycles at a maximum pressure of 300 MPa, and thus the maximum pressures were 300 MPa or higher. These are at levels more than 0.3α times the tensile strength.

As to No. 9 being a reference example, since it has a similar composition to that of the steel C in Table 1, coarse inclusions exist as shown in Table 2 in Reference Experiment 1 although the probability thereof is low. For this reason, although no rupture occurred in the internal pressure fatigue test described above, if the internal pressure fatigue test is conducted on a large number of specimens at still higher pressures, the specimens may be broken in shorter times than in the example embodiments of the present invention. This is evident from the results of Reference Experiment 2 mentioned above.

INDUSTRIAL APPLICABILITY

According to the present invention, it is possible to obtain a steel pipe for fuel injection pipe that has a tensile strength of 800 MPa or higher, preferably 900 MPa or higher, and is excellent in internal pressure fatigue resistance. Therefore, the steel pipe for fuel injection pipe according to the present invention is suitably applicable especially to a fuel injection pipe for automobiles.

The invention claimed is:

1. A steel pipe for fuel injection pipe having a chemical composition consisting, by mass percent, of C: 0.12 to 0.27%,
Si: 0.05 to 0.40%,
Mn: 0.3 to 2.0%,
Al: 0.005 to 0.060%,
N: 0.0020 to 0.0080%,
Ti: 0.005 to 0.015%,
Nb: 0.015 to 0.045%,
Cr: 0 to 1.0%,
Mo: 0 to 1.0%,
Cu: 0 to 0.5%,
Ni: 0 to 0.5%,
V: 0 to 0.15%, and
B: 0 to 0.005%,
the balance being Fe and impurities, and
contents of Ca, P, S, and O in the impurities being
Ca: 0.0001 to 0.0007%,
P: 0.02% or less,
S: 0.01% or less, and
O: 0.0040% or less, and having a metal micro-structure consisting of a tempered martensitic structure, or a mixed structure of tempered martensite and tempered bainite, in which a prior-austenite grain size number is 10.0 or more, wherein the steel pipe has an outer diameter of 20 mm or less, an inner diameter 2.5 mm or more, a wall thickness of 1.5 mm or more, a tensile strength of 800 MPa or higher, and a critical internal pressure satisfying a following formula (i):

$$IP \geq 0.3 \times TS \times \alpha \quad \text{(i)}$$

$$\alpha = [(D/d)^2 - 1]/[0.776 \times (D/d)^2] \quad \text{(ii)}$$

where, in the above formula (i), IP denotes a critical internal pressure (MPa), TS denotes a tensile strength (MPa), and α is a value represented by the above formula (ii), and where, in the above formula (ii), D denotes an outer diameter (mm) of the steel pipe for fuel injection pipe, and d denotes an inner diameter (mm) of the steel pipe for fuel injection pipe.

2. The steel pipe for fuel injection pipe according to claim 1, wherein the chemical composition contains, by mass percent, one or more elements selected from
Cr: 0.2 to 1.0%,
Mo: 0.03 to 1.0%,
Cu: 0.03 to 0.5%,
Ni: 0.03 to 0.5%,
V: 0.02 to 0.15%, and
B: 0.0003 to 0.005%.

3. The steel pipe for fuel injection pipe according to claim 1, wherein the outer diameter and the inner diameter of the steel pipe satisfy a following formula (iii):

$$D/d \geq 1.5 \quad \text{(iii)}$$

where, in the above formula (iii), D denotes the outer diameter (mm) of the steel pipe for fuel injection pipe, and d denotes the inner diameter (mm) of the steel pipe for fuel injection pipe.

4. A fuel injection pipe comprising the steel pipe for fuel injection according to claim 1.

5. The steel pipe for fuel injection pipe according to claim 2, wherein the outer diameter and the inner diameter of the steel pipe satisfy a following formula (iii):

$$D/d \geq 1.5 \quad \text{(iii)}$$

where, in the above formula (iii), D denotes the outer diameter (mm) of the steel pipe for fuel injection pipe, and d denotes the inner diameter (mm) of the steel pipe for fuel injection pipe.

6. A fuel injection pipe comprising the steel pipe for fuel injection according to claim 2.

7. A fuel injection pipe comprising the steel pipe for fuel injection according to claim 3.

8. A fuel injection pipe comprising the steel pipe for fuel injection according to claim 5.

* * * * *